United States Patent [19]

Porsche

[11] 4,230,332

[45] Oct. 28, 1980

[54] BICYCLE FRAME

[76] Inventor: Ferdinand A. Porsche, Gut Heuberg, Winkl 5, St. Georgen, A-5662 Gries im Pinzgau, Austria

[21] Appl. No.: 12,180

[22] Filed: Feb. 14, 1979

[51] Int. Cl.³ .............................................. B62K 19/08
[52] U.S. Cl. ................................ 280/281 B; 280/274; 280/281 R
[58] Field of Search ............... 280/281 R, 281 B, 274, 280/610

[56] References Cited

U.S. PATENT DOCUMENTS

| | | | |
|---|---|---|---|
| 849,227 | 4/1907 | Genelly et al. | 280/201 |
| 2,182,828 | 12/1939 | Stutsman et al. | 280/281 R |
| 2,370,726 | 3/1945 | Hess et al. | 280/281 R |
| 2,525,618 | 10/1950 | Pierce, Jr. | 280/610 |
| 2,537,325 | 1/1951 | Bowden | 280/281 R |
| 2,866,730 | 12/1958 | Potchen et al. | 280/610 |
| 3,201,138 | 8/1965 | Brown, Jr. | 280/610 |
| 3,233,916 | 2/1966 | Bowden | 280/281 R |
| 4,005,611 | 2/1977 | Jeffries | 280/236 |

Primary Examiner—John J. Love
Assistant Examiner—Donn McGiehan
Attorney, Agent, or Firm—Beveridge, DeGrandi, Kline & Lunsford

[57] ABSTRACT

A bicycle frame is comprised of a hollow panel extending between and secured to the tubular steering column and the tubular seat column in lieu of the hollow tubing ordinarily found in bicycle frames. The hollow panel divides into two parallel spaced apart hollow panels which taper downwardly and rearwardly from the tubular seat column to define at the end thereof a support for the rear wheel axle of the bicycle. The hollow panels are each formed from two curved walls joined together along inturned edges with each wall comprised of a lightweight lamination. A seat is vertically adjustable within the tubular seat column and a piston within the tubular seat column is operably connected to the seat so that upon loosening of the seat, reciprocation of the seat and piston will pump air under pressure outwardly through a hose connected at the bottom of the column and detachably secured to the underside of the hollow panel which constitutes the frame.

9 Claims, 19 Drawing Figures

Section E-E

Fig. 6

Section F-F

Section G—G

BICYCLE FRAME

BACKGROUND OF THE INVENTION

1. Field of the Invention

The present invention is directed to a new and improved bicycle frame comprised of a hollow lightweight panel interconnecting the steering column and the seat column with a bicycle pump built into the seat column.

2. Prior Art

For many years the conventional bicycle frame was constructed from hollow tubular members which were arranged in a substantially triangular configuration. In men's bicycles a substantially horizontal tubular member was connected at opposite ends to the top of the relatively short hollow steering column and to the top of the relatively long seat support column. A second tubular member was connected to the lower end of the steering column and the hub of the pedals which was in turn secured to the lower end of the seat column. In women's bicycle frames the horizontal tubular member found in men's bicycles is angled downwardly from the top of the steering column to a point substantially midway of the seat column to permit easier mounting and demounting. In another women's model two parallel curved tubular members were secured at their upper ends to the steering column and at their lower ends to the hub and lower end of the seat column.

In addition to this main frame, it has been conventional for years to have two substantially triangular frames constructed of hollow tubular members extend rearwardly in substantially parallel spaced apart relation from the seat column to provide a support for the rear wheel axle.

In recent years some children's bicycles have been provided with a substantially triangular shaped decorative panel which fits within the conventional triangular framework formed from tubular members and is secured to the tubular framework by means of clips or the like. Such panels do not provide any support function whatsoever and are solely for purposes of decoration.

With respect to bicycle pumps it is old and well-known to provide a separate tubular bicycle pump which could be secured to the exterior surface of the tubular seat support column.

SUMMARY OF THE INVENTION

The present invention provides a new and unique bicycle frame which is comprised of a hollow panel which is connected to and extends between the hollow tubular steering column and the hollow tubular seat support column. The hollow panel is the sole support between the steering column and the seat column and a pair of hollow panels of similar construction extend rearwardly from the seat column in spaced apart parallel relation to each other to provide a support for the rear wheel axle.

The present invention provides a new and improved bicycle frame which is of lightweight construction and which is comprised of two curved walls secured together along their opposite edges. Each of the walls is comprised of a lightweight lamination which may be comprised of an aluminium honeycomb core sandwiched between aluminium or fiberglass sheets which may define the outer skin or may be comprised of a balsa wood core having an outer skin of aluminium or fiberglass.

The present invention provides a new and improved bicycle frame having a built in bicycle pump located within the hollow tubular seat support column. The seat per se is detachably connected to the hollow tubular member which is telescopically slidable within a seat support column and means are provided for releasably securing the tubular member to the seat column. The seat is also connected to piston means located within the hollow tubular seat support column so that upon disconnecting the seat from the tubular member the seat and piston may be reciprocated to pump air under pressure outwardly through a hose connected to the bottom of the seat column. The hose is long enough to reach the valves located in the front and rear wheels of the bicycle and when not in use may be detachably connected along the lowermost edge of the hollow panel which constitutes the main frame of the bicycle.

The foregoing and other objects, features and advantages of the invention will be apparent from the following more particular description of preferred embodiments of the invention as illustrated in the accompanying drawings.

DETAILED DESCRIPTION OF THE INVENTION

Figure 1:
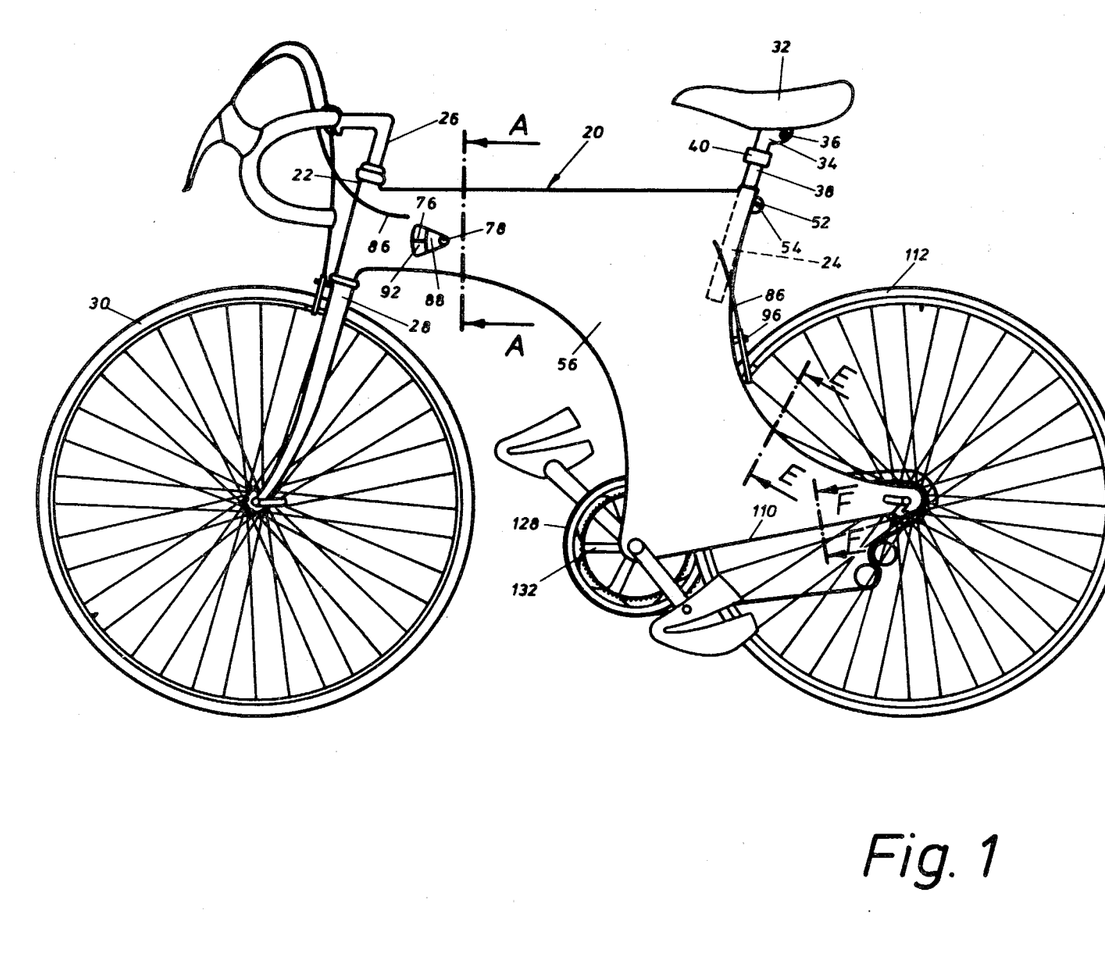
FIG. 1 is a diagrammatic side elevation view of a men's bicycle provided with a bicycle frame according to the invention.
Figure 2:
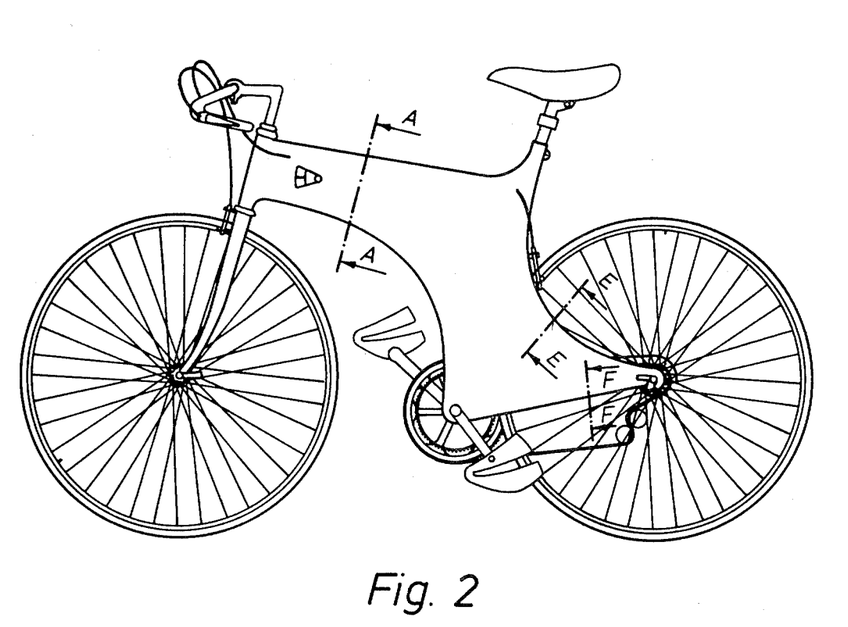
FIG. 2 is a diagrammatic side elevation view of a children's bicycle provided with a bicycle frame according to the invention.
Figure 3:
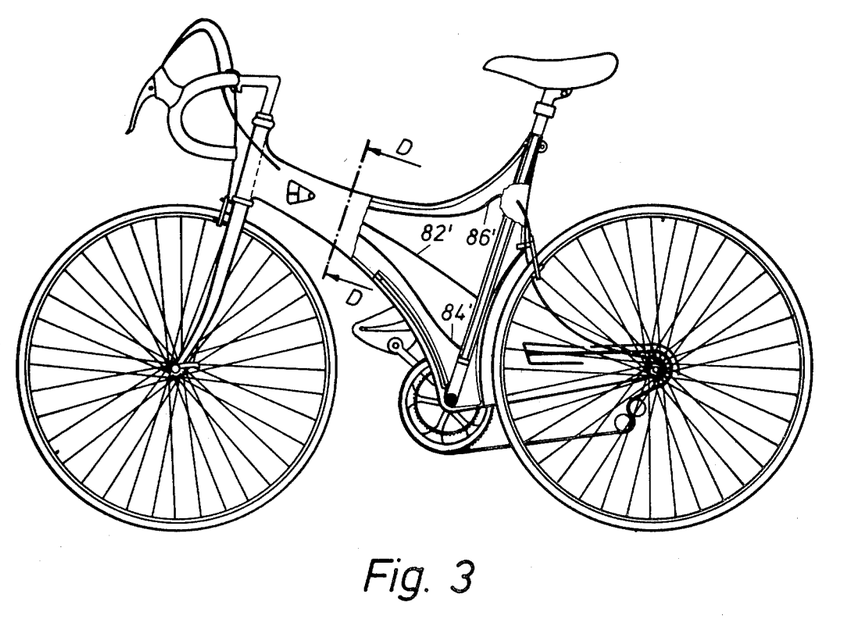
FIG. 3 is a diagrammatic side elevation view, partly in section, of a women's bicycle provided with a bicycle frame according to the invention.

FIGS. 1 to 3 show a men's bicycle, a children's bicycle and a women's bicycle each provided with a bicycle frame according to the present invention, in diagrammatic side elevation view. Of these, only FIG. 1 is provided with reference numbers for the essential parts of the bicycle. These reference numbers are explained in detail in the following in connection with other figures of the drawings.

Figure 4:
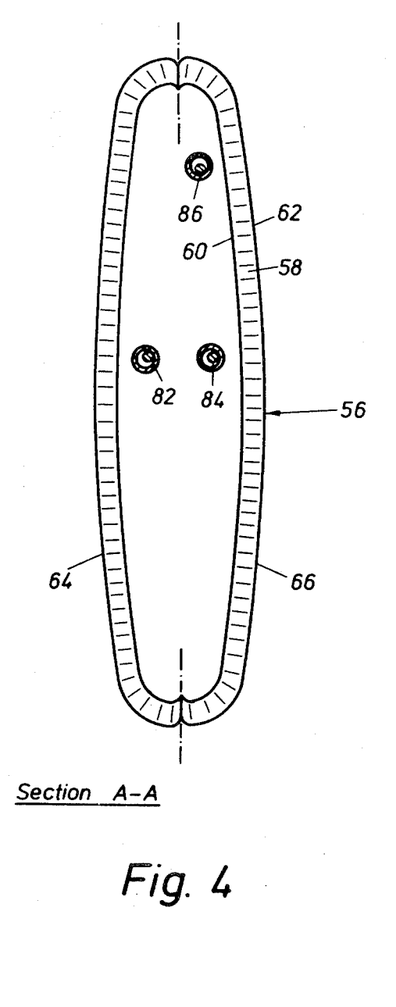
FIG. 4 is a sectional view of the frame of the bicycles shown in FIGS. 1 and 2 taken along line A—A.
Figure 5:
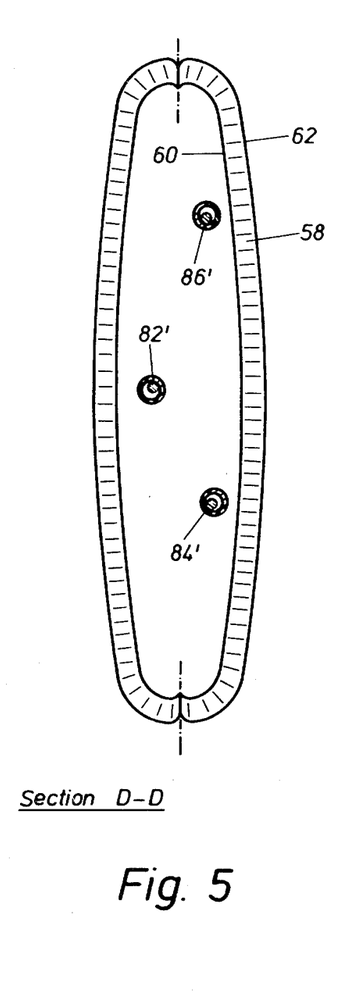
FIG. 5 is a sectional view of the frame of the women's bicycle shown in FIG. 3 taken along line D—D.

In the sectional view of FIG. 4, the hollow panel is generally given the reference number 56. The two side walls bear the reference numbers 64 and 66, the honeycomb structure is referred to as 58, the cables for rear wheel brake and change-speed mechanisms bear the reference numbers 86 and 82, 84 respectively. Similar to this, FIG. 5 shows a sectional view of the frame of a women's bicycle according to FIG. 3, but with slightly differently arranged cables 82', 84' and 86'.

Figure 6:
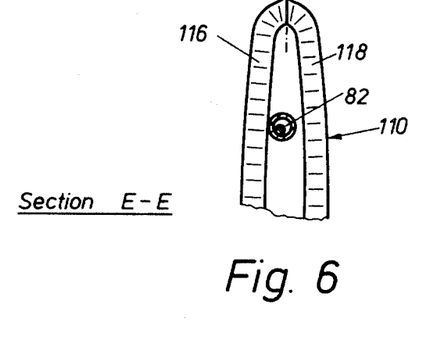
FIG. 6 is a sectional view of the frame of the bicycles shown in FIGS. 1 and 2 taken along line E—E.
Figure 7:
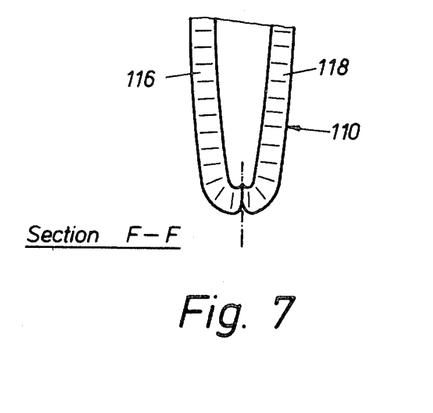
FIG. 7 is a sectional view of the frame of the bicycles shown in FIGS. 1 and 2 taken along line F—F.
Figure 8:
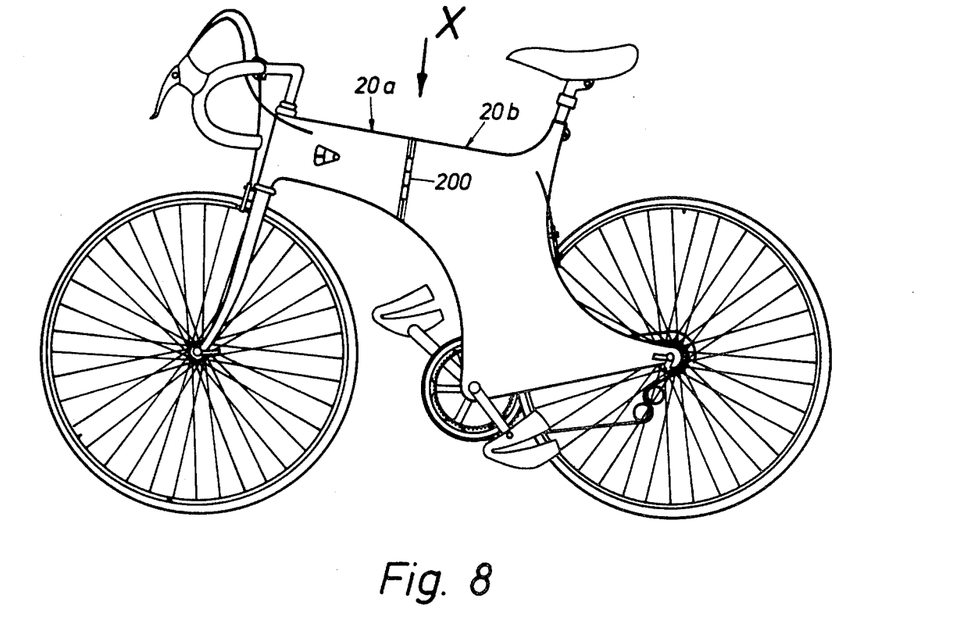
FIG. 8 is a diagrammatic side elevation view of a collapsible bicycle provided with a bicycle frame according to the invention.
Figure 9:
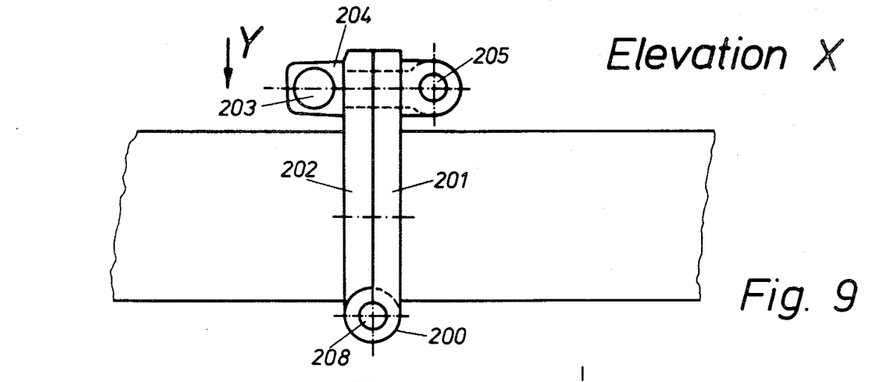
FIG. 9 a plan view in the direction of arrow X onto that part of the frame of the collapsible bicycle according to FIG. 8 in which the folding hinge is arranged, the folding hinge being shown in the closed state.
Figure 10:
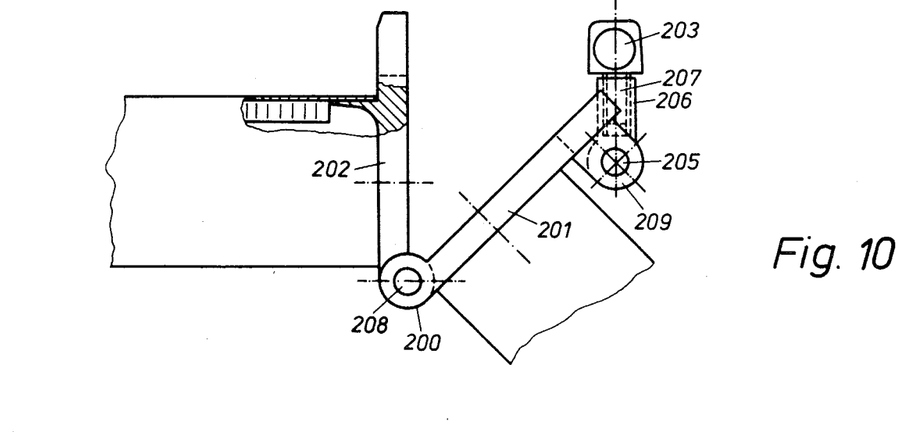
FIG. 10 a plan view of the folding hinge according to FIG. 9 in the open state.
Figure 11:
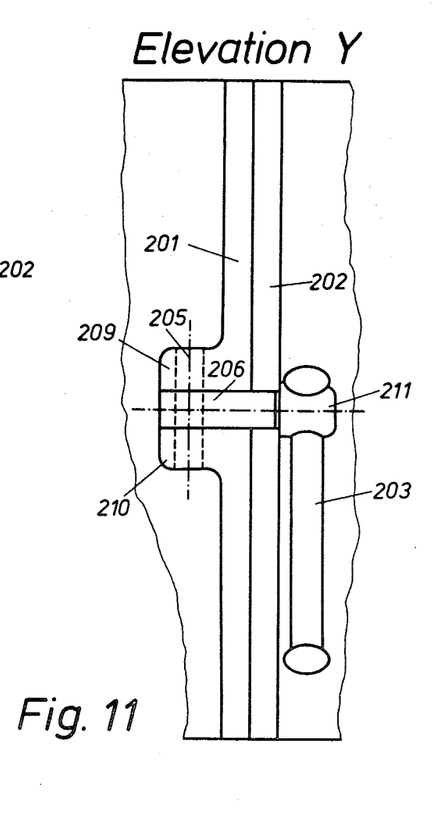
FIG. 11 is a side elevation view of the hinge lock part according to FIG. 9 in the direction of arrow Y.
Figure 12:
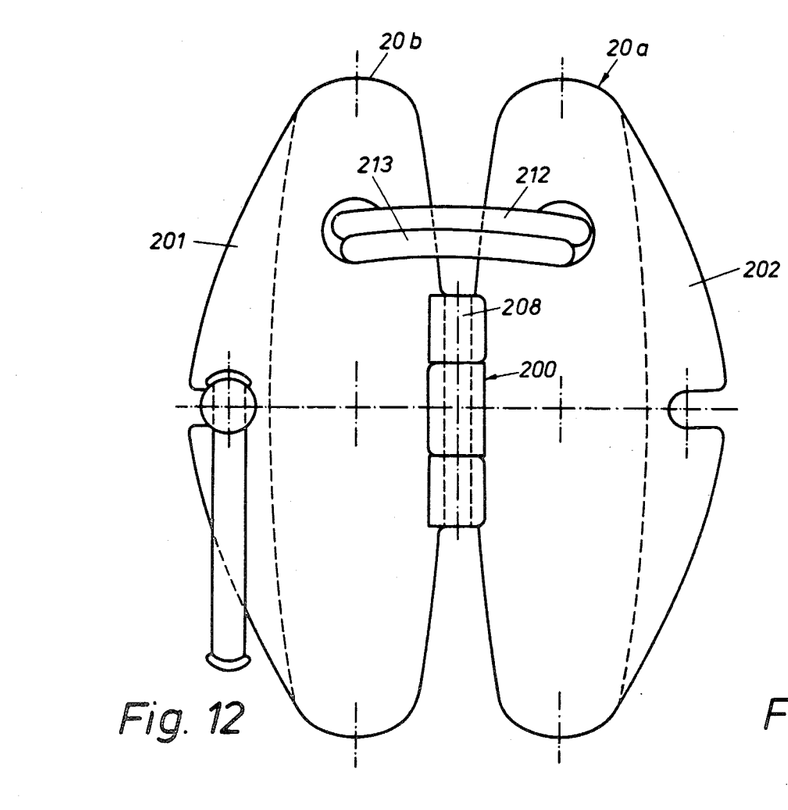
FIG. 12 is a front elevation view of the hinge plates connecting the end parts of the bicycle at completely folded collapsible bicycle.
Figure 13:
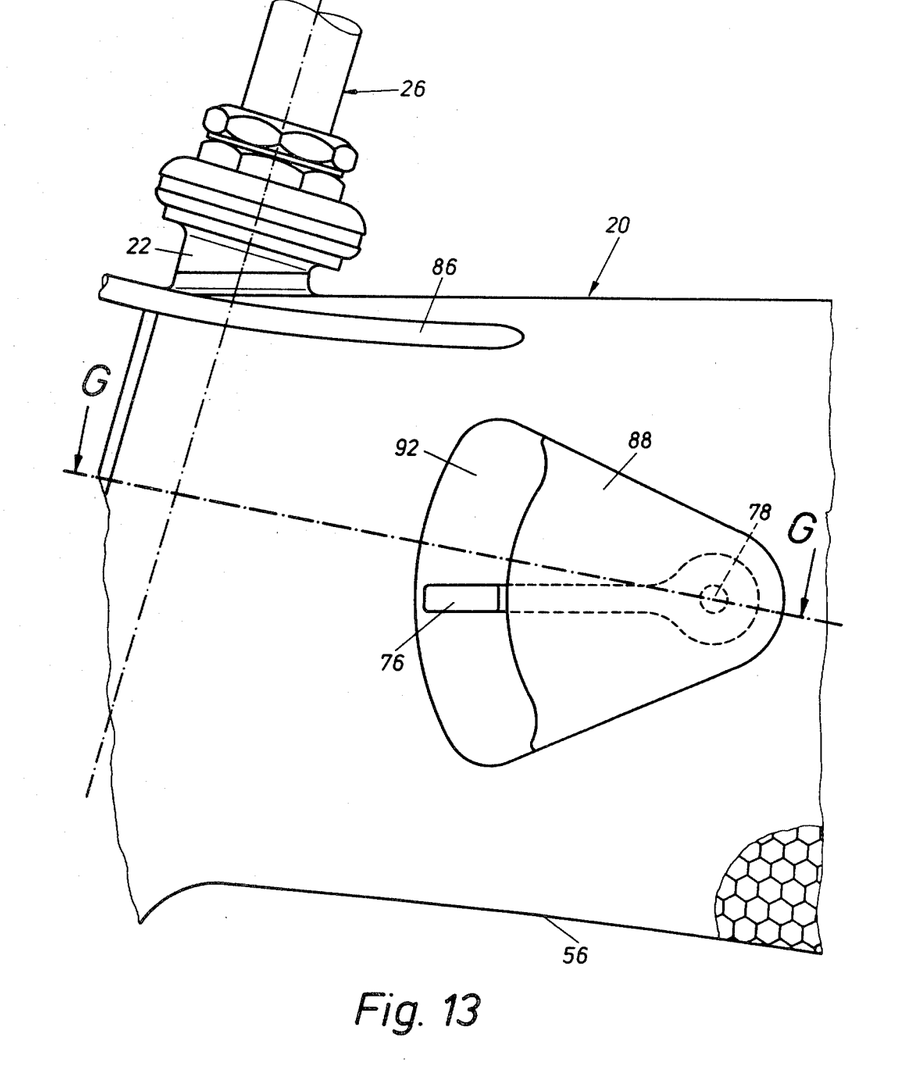
FIG. 13 is a side elevation view of the bicycle frame according to the invention for a men's bicycle with portions of the hollow panel broken away to show the interior thereof.

FIGS. 6 and 7 are sectional views taken along lines E—E and F—F of FIG. 1 of one of the auxiliary frame parts supporting the rear wheel;

FIG. 8 shows a collapsible bicycle in diagrammatic side elevation view with collapsible frame parts 20a and 20b and a folding hinge 200;

FIGS. 9 to 11 show details of the hinge range of the collapsible bicycle. FIG. 9 shows the position of the hinge when the bicycle is unfolded for use, with the two hinge plates abutting and held together by means of swivel pins 203, 204, 205. FIG. 10 shows the hinge at the beginning of collapsing the bicycle. 205 and 208 are the reference numbers used for the axes of rotation of the swivel pin arrangement 203, 206, 207, 209 and the hinge 200. FIG. 11 shows a side elevation view of the hinge lock part according to FIG. 9 in the direction of arrow Y. The reference numbers 209 and 210 are used for the bearing eyes of the hinge lock, 203 refers to the bolt handle;

FIG. 12 shows a front elevation view of the hinge plates connecting the end parts of the bicycle at completely collapsed bicycle, 212 referring to the cable for the rear wheel brake and 213 referring to the cable for the change-speed mechanism.

Figures 15, 18:
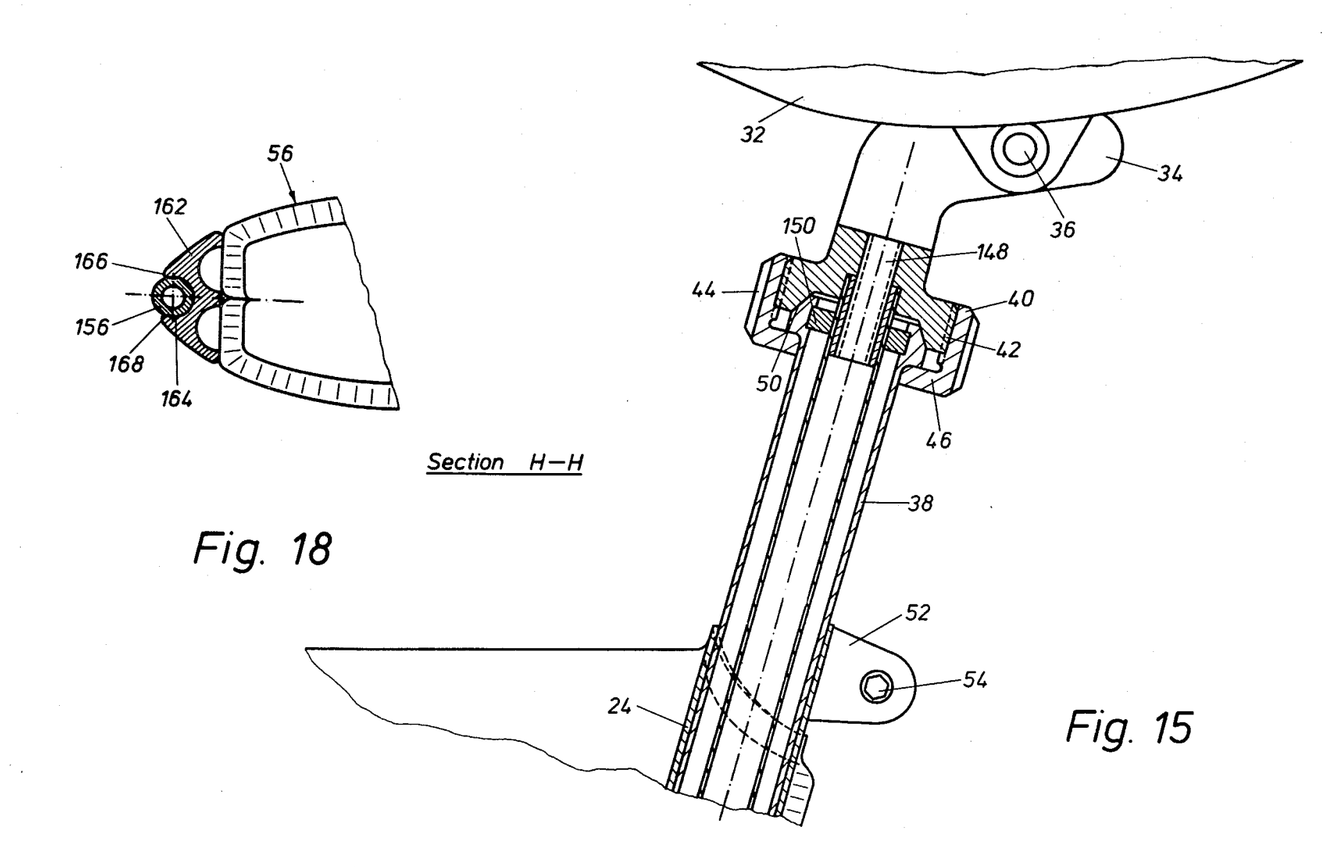
FIG. 15 is a side elevation view, partly in section, showing the seat connections adjustable and detachable in relation to the bicycle frame.
FIG. 18 is a sectional view taken along line H—H in FIG. 17.

The bicycle according to the present invention as shown in FIG. 1 is provided with a new and improved frame 20 which is comprised of a hollow substantially triangular shaped panel which extends between and is secured to the hollow tubular steering column 22 and the hollow tubular seat support column 24. The conventional handlebar assembly generally designated at 26 is rotatably mounted within the column 22 and is connected to the conventional fork mechanism 28 which supports the front wheel 30 for turning movement. The seat 32 (see also FIG. 15) is pivotably connected to a seat support 34 by means of a conventional adjustable pivot arrangement 36. The seat support 34 is detachably connected to a hollow tubular support member 38 by means of a sleeve 40 which is threaded on to the seat support member 34 at 42. The sleeve 40 is provided with a hexagonal surface 44 which facilitates engagement by a wrench and is further provided with a flange 46 which engages an annular projection 48 on the upper end of the hollow tubular member 38. The seat support 34 and the annular projection 48 are provided with complementary bevelled surfaces 50 so that upon threading the sleeve 40 onto the seat support 34, the flange will clamp the bevelled surfaces 50 of the seat support 34 and the annular projection 48 together in the desired position of rotatable adjustment of the seat support relative to the hollow tubular member 38. The hollow tubular member 38 is telescopically slidable within the tubular seat support column 24 and is clamped in adjusted position by means of a conventional clamp arrangement which is comprised of a pair of ears 52, one of which is shown in FIG. 15, which extend rearwardly from opposite sides of the support column 24 and which are drawn together by means of a nut and bolt assembly 54 to frictionally grip the hollow tubular member 38.

Instead of the conventional hollow tubular rods connecting the steering column 22 and the seat support column 24, the frame 20 according to the present invention is comprised of a hollow panel 56 which encloses the steering column 22 and the seat support column 24 and which extends therebetween.

Figure 14:
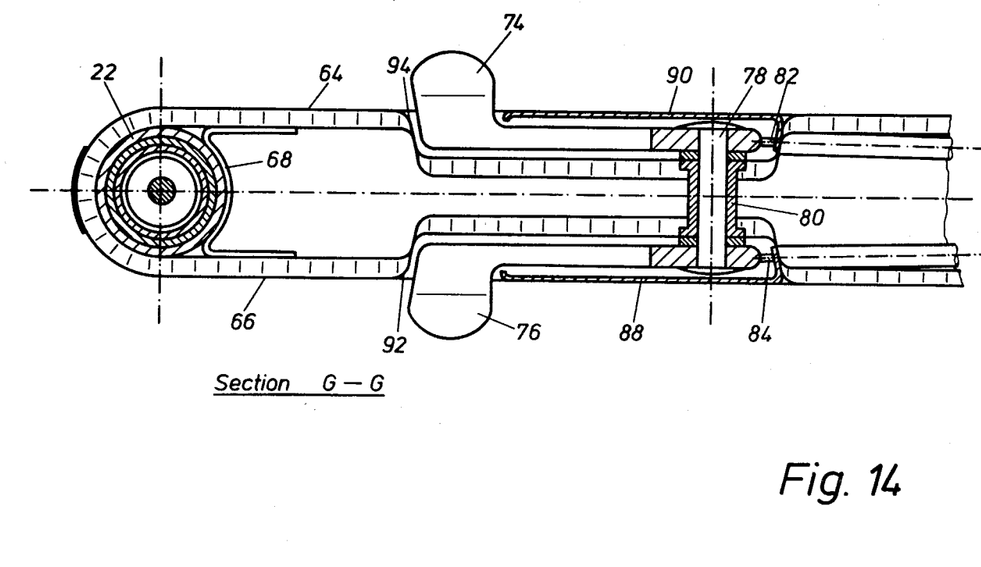
FIG. 14 is a sectional view along the line G—G in FIG. 13.

The hollow panel is comprised of a honeycomb core 58 sandwiched between two sheets 60, 62 of aluminium or fiberglass. The sheets which constitute the outer skin of the lamination may be bonded to the core by any suitable means such as an epoxy adhesive. As best seen in FIG. 14, the hollow panel 56 is formed by wrapping the laminate about the steering column 22 so that two curved, spaced apart side walls 64 and 66 extend rearwardly to the seat support column 24. The laminate may be secured directly to the steering support column 22 by any suitable means and an internal bracket 68 is provided which is secured to the internal opposed surfaces of the panel 56 and which conforms to the rear surface of the steering support column 22. The bracket 68 may also be secured to the steering column 22 or may merely be disposed in engagement with the column to hold the laminate in close engagement with the column. The side walls 64 and 66 of the panel 56 are also wrapped about the seat support column 24 and the butted edges are secured to each other by any suitable means such as epoxy or the like. A bracket similar to the bracket 68 may also be provided within the hollow panel 56 in engagement with the seat support column 24.

The side walls 64 and 66 of the hollow panel 56 (see especially FIG. 14) are curved inwardly along their top and bottom edges into abutting relation with each other and are secured together by any suitable means such as epoxy.

The side panels 64 and 66 are recessed at 70 and 72 and levers 74 and 76 are located within the recesses 70 and 72, respectively. The levers are pivoted about a common pivot pin 78 which extends between and is mounted in the two recesses and which is disposed within a bearing sleeve 80. Each of the levers 74 and 76 are operably connected to cables 82 and 84 respectively which in turn are connected to the change-speed mechanisms conventionally associated with 10-speed bicycles. The cables extend through the interior of the hollow panel until they reach the vicinity of the appropriate change-speed mechanism whereupon they exit from the interior of the hollow panel through a suitable aperture. For a 5-speed bicycle, only one lever and cable mechanism would be provided and located in a recess in only one of the side walls. For a 3-speed bicycle having the change-speed mechanism, also in the form of a lever, located on the handle bars, the operating cable thereof could also extend through the interior of the hollow panel 56. In this case, as well as the case of a 1-speed bicycle, it would not be necessary to provide any recesses or levers in the side walls of the hollow panel. As best seen in FIG. 4, the rear brake operating cable 86 extending from the conventional hand operated lever on the handlebars to the rear caliper can also extend through the interior of the hollow panel 56. Suitable cover plates 88 and 90 are secured within the recesses 72 and 70, respectively, leaving only arcuate apertures 92 and 94 to which the operating ends of the levers 76 and 74 protrude (FIG. 14).

The rear wheel brake cable 86 (see FIG. 16) enters and exits from the interior of the hollow panel 56 through suitable apertures and the cable is operably connected to the conventional rear wheel caliper brake generally designated at 96. The details of such a brake are conventional in the art and it is not deemed necessary to describe the construction and operation of the brake mechanism in detail. The caliper 96 is mounted on a stud 98 which is secured to and extends through a guide sleeve 100 which in turn is secured in an aperture 102 in the hollow panel 56.

Figure 16:
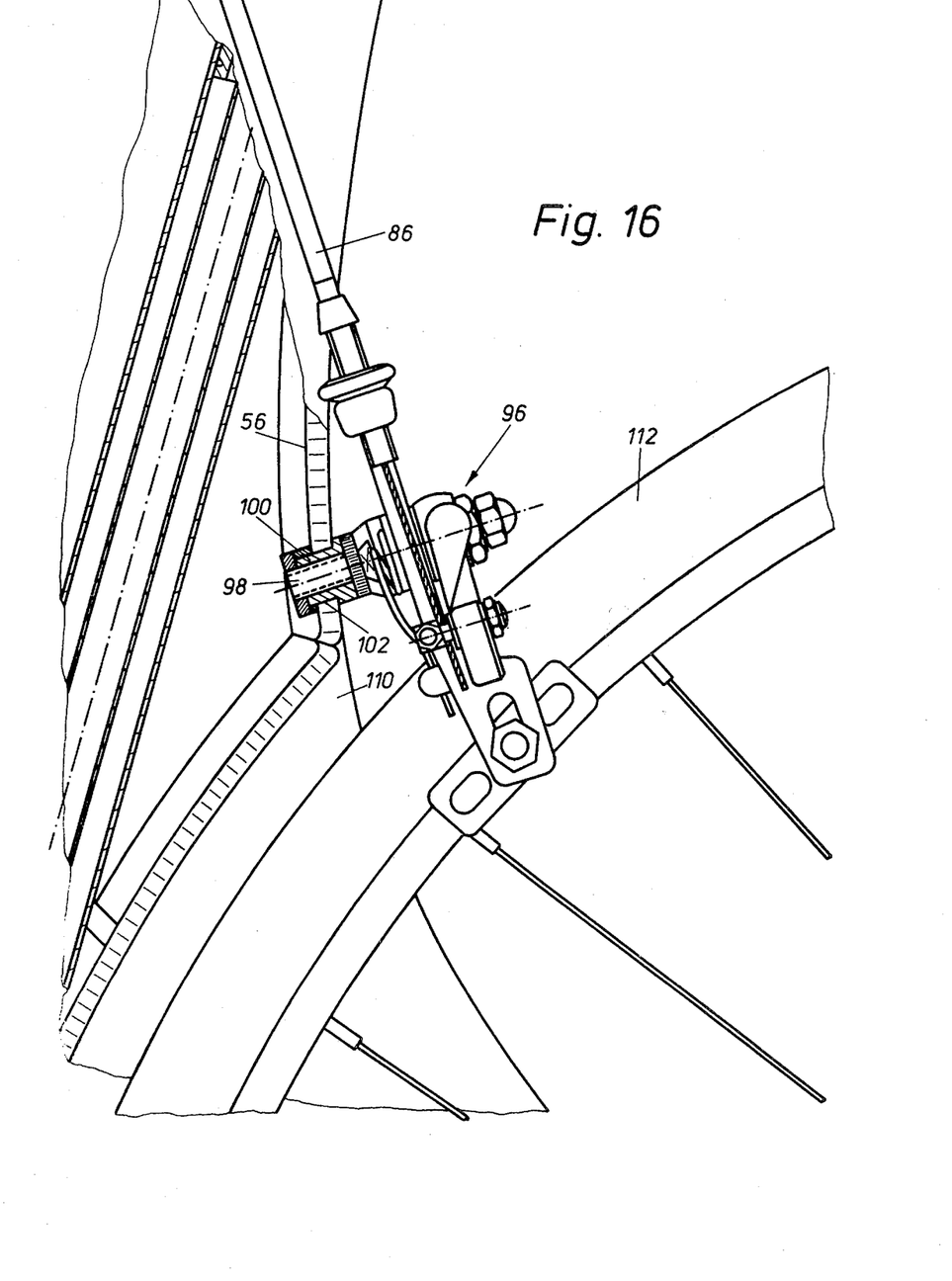
FIG. 16 is a partial detailed side elevation view, partly in section, of the rear portion of the main frame, showing the connection of the rear wheel support frames and the rear wheel brake calliper.
Figure 19:
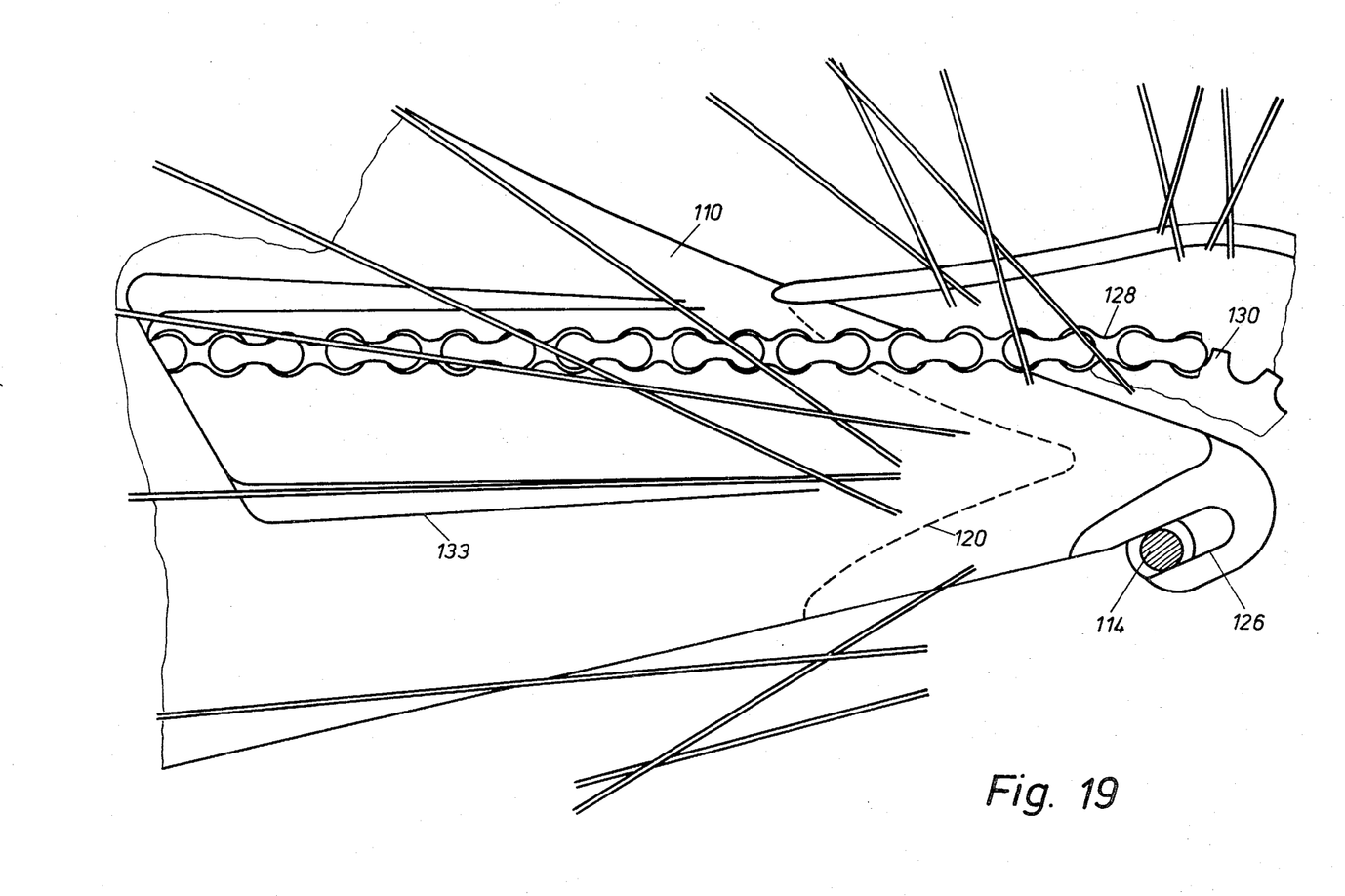
FIG. 19 is a side elevation view of the rearwardly extending frames which provide a support for the rear wheel axle.

Extending rearwardly from the rear edge of the hollow panel 56, are two additional hollow panels 110 which are considerably thinner than the hollow panel 56 and which extend parallel to each other. Only one of the panels 110 is shown in FIG. 16 since the other one has been removed for the sake of clarity. The two panels 110 are secured by any suitable means to the rear edge of the panel 56 and straddle the rear wheel 112 to provide a support for the axle 114 of the rear wheel (FIG. 19). Each frame 110 is formed from two curved side walls 116 and 118 as best seen in FIGS. 6 and 7. The hollow panels 110 may be filled with any suitable reinforcing structure as shown by dotted lines at 120 (FIG. 19) to provide additional strength at the point of support for the rear axle 114. The panels 110 are provided with grooves 126 in which the axle 114 may be adjustably disposed and clamped by means of bolts and washers which will engage the outer surfaces of the panels 110. The rear wheel is driven by a conventional chain 128 which is entrained about a conventional sprocket 130. Since the sprocket 130 will be located between the two panels 110 an aperture 133 is provided in the panel 110 as illustrated in FIG. 8 through which the chain 128 will pass to the outside of the main hollow frame 56 (FIG. 19).

Figure 17:
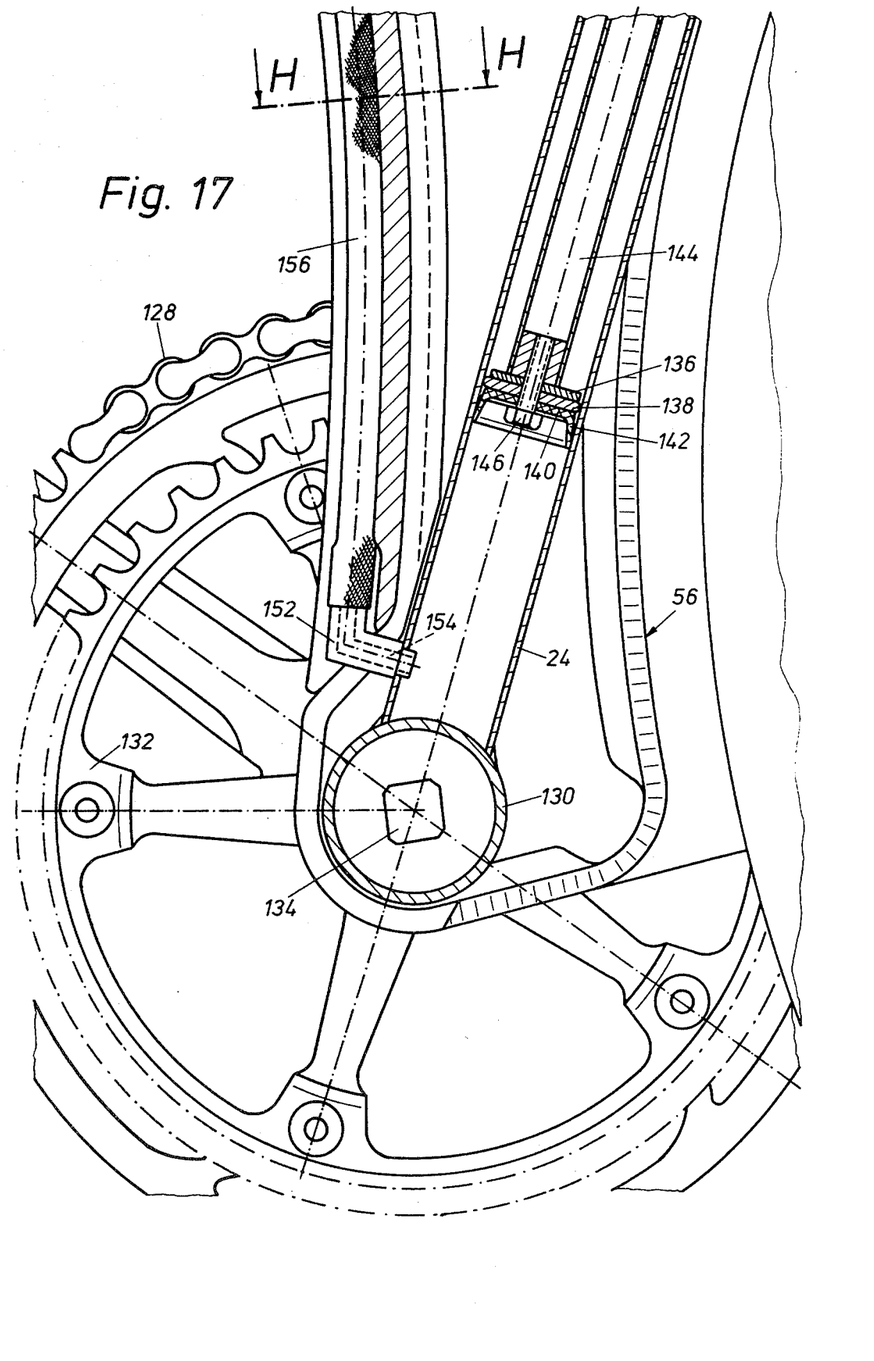
FIG. 17 is a partial detailed side elevation view, partly in section, of the lower portion of the bicycle frame showing the built in bicycle pump.

The lower portion of the main hollow frame 56 extends downwardly about the hub 130 within which the pedal crank is rotatably mounted (FIG. 17). A conventional double sprocket wheel 132 of the type used with multi-speed bicycles is mounted on the pedal crank 134 in a conventional manner. The lower end of the seat support column 24 is welded to the hub 130 so that the lowermost end of the seat support column 24 is completely closed. A conventional bicycle pump piston 136 is disposed within the column 24 and is provided with a bearing ring 138 and a cup member 140 having outwardly diverging flexible walls 142 engaging the interior walls of the hollow column 24. The entire piston assembly is secured to the lower end of a piston rod 144 by means of a bolt 146 and the upper end of the piston rod is secured to a downwardly extending pin 148 integral with a seat support 34. The pin 148 may be connected to the piston rod 144 by a threaded connection or any other suitable means. The bearing ring 150 is mounted in the enlarged head 48 on the tubular member 38 for engaging and guiding the piston rod 144. The piston rod 144 may be hollow as shown in FIG. 17 or may be a solid rod.

An air hose fitting 152 extends through and is secured to the hollow support column 24 and is provided with an internal passage 154 which is in communication with the interior of the lower end of the column 24. A flexible air hose 156 is connected to the fitting 152 and is long enough to reach the air valves on the front and rear tires. When the air hose 156 is not being used, it may be secured to the lower edge of the main hollow panel 56 in the following manner: the main hollow panel 56 is provided with a flat lower surface 160 along a substantial distance thereof and a substantially rigid hose mounting member 162 of plastic material or the like is secured to the flat surface 160 by any suitable means such an epoxy adhesive (see FIG. 18). The lowermost edge of the hose mounting member 162 is provided with a circular groove having spaced apart re-entrance lips 166 and 168 so that the air hose 156 must be compressed in order to snap the same into the recess. An additional U-shaped spring clip (not shown) may also be provided for supporting an air valve fitting which is secured to the end of the hose 156.

When it is desired to operate the pump it is only necessary to free the air hose 156 from the spring clip and the groove or recess 164 and place the fitting in operative engagement with the selected tire valve. The sleeve 44 is then unscrewed from the seat support 34 so that the seat support may move relative to the hollow tubular member 38. Since the seat height is determined by the position of the hollow tubular member 38 relative to the column 24, it is not necessary to vary the setting for seat adjustment when it is desired to use the seat as a handle for the air pump. With the seat support 34 free from the hollow tubular member 38, the seat 32 may be grasped and raised up and down to reciprocate the piston 144 within the column 24. Upon downward movement of the piston rod 144, the air will be pushed ahead of the cup member 140 secured to the lower end of the piston to force air outwardly through the fitting 152 and the air hose 156 to inflate the tire. When the seat and piston are raised, the flexible walls 142 of the cup member 140 will allow air to pass the piston assembly. After the tire has been inflated to the desired pressure, it is only necessary to snap the hose back into the recess and spring clip beneath the main hollow frame 56, lower the seat support 34 into engagement with the hollow tubular member 38 and thread the sleeve 44 back into engagement with the seat support 34 to clamp the seat in the desired position.

The exact overall configuration of the main hollow panel 56 and the rearwardly extending axle supporting frames 110 may vary considerably and still remain within the scope of the present invention. Likewise, the actual construction of the laminate which forms the panel may also vary considerably. In lieu of the aluminium honeycomb core, a balsa wood core may be substituted and laminated to aluminium or fiberglass sheets of material which would define the skin for the laminate. The construction of the bicycle frame from the hollow panels provides an extremely lightweight attractive frame construction in which the various cable mechanisms associated with hand operated brakes and multiple speed bicycles may be disposed.

While the invention has been particularly shown and described with reference to various preferred embodiments thereof, it will be understood by those in the art that various changes in form and details may be made therein without departing from the spirit and scope of the invention.

What is claimed is:

1. A bicycle frame comprising a hollow tubular steering support column which is formed to receive and rotatably support a handlebar and front wheel fork assembly, a hollow tubular seat support column which is formed to receive and adjustably support a seat assembly, the frame having the form of a hollow panel connected to and extending between said columns, said hollow panel being formed of two side panels which are disposed in spaced apart parallel relation to each other and surround the steering support column and the seat support column, each of said side panels being a three-ply laminate which has thin sheets of material bonded to opposite surfaces of a lightweight core.

2. A bicycle frame according to claim 1, wherein the side panels abut and are connected to one another at the locations where they surround the steering support column and the seat support column.

3. A bicycle frame according to claim 1, wherein said core is an aluminum honeycomb.

4. A bicycle frame according to claim 1, wherein said core is formed of balsa wood.

5. A bicycle frame according to claim 1, wherein said sheets are formed of aluminum.

6. A bicycle frame according to claim 1, wherein said sheets are formed of fiberglass.

7. A bicycle frame according to claim 1 or 2, wherein the side panels have upper and lower edges which are curved toward each other and secured to each other in abutting relation.

8. A bicycle frame according to claim 1 or 2, wherein at least one of said side panels is substantially triangular.

9. A bicycle frame according to claim 1 or 2, wherein said side panels are of integral, one piece construction and include a connecting portion which is wrapped about the steering support column.

* * * * *